Sept. 6, 1949.  F. ADOLPH  2,480,825
ELECTRIC VIBRATION MOTOR
Filed June 23, 1947
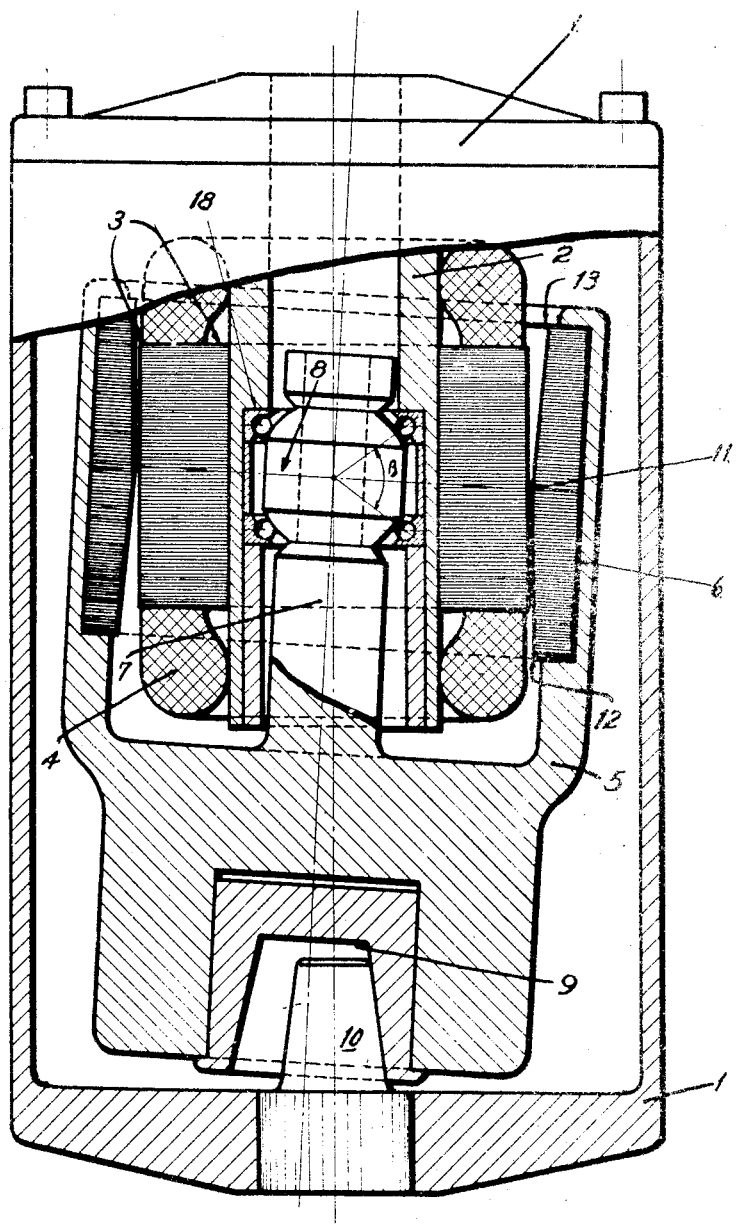
INVENTOR
FRIEDRICH ADOLPH
By Cameron Kerkam + Sutton
ATTORNEY Patented Sept. 6, 1949

2,480,825

UNITED STATES PATENT OFFICE 2,480,825

ELECTRIC VIBRATION MOTOR

Friedrich Adolph, Ljungby, Sweden, assignor, by mesne assignments, to Vibro-Plus Corporation, New York, N. Y., a corporation of Delaware Application June 23, 1947, Serial No. 756,473
In Sweden June 29, 1945

3 Claims. (Cl. 172—36)

The present invention relates to an electric vibration motor built according to the so-called "conical pendulum" principle, which principle is explained and exemplified in such patents as that to Svenson, No. 2,194,410, dated March 19, 1940.

In known vibration motors generally constructed as an electric motor the shaft of which is provided with one or more eccentric weights, the vibration frequency will be equal to the number of revolutions of the motor. By means of transmission gearing, e. g. with gear wheels, the vibration frequency may obviously be given a value deviating from the number of revolutions of the motor. A gearing device of this kind is, however, bulky and expensive and requires an increased number of bearings in the structure. Moreover, the bearings must serve to transfer the centrifugal force from the eccentric weights to the motor frame to which the apparatus to be vibrated is connected. Especially when a high vibration frequency is desired, the bearings will thus be subjected to heavy strains which will reduce their durability.

The present invention has for its object to eliminate said drawbacks, and is based on the conical pendulum principle. According to the invention an electric motor is formed into or united with a conical pendulum device, so that a unit is formed, the invention being characterized in that the rotor of the motor is rotatably and swingably journalled in the motor frame which is rigidly connected to the stator, so that the rotor can move as a conical pendulum, said pendulum rolling against a surface of revolution rigidly connected to the motor frame and limiting the outward swinging of the pendulum, for the purpose of converting in a manner known per se by planetary action, the conical pendulum movement of the rotor into vibrations with higher frequency than the number of revolutions of the motor.

The principle of the invention will be seen from the embodiment shown by way of example in the accompanying drawing. 1 designates the motor frame of a short-circuited three-phase motor in which the stator 2 with the stator lamination 3 and windings 4 is fixed. The rotor 5 with its laminations 6, in which short-circuit rods are fixed in known manner, rotates around the stator. The rotor is, by means of a shaft 7, rotatably and swingably supported by a bearing 8 arranged in the centre of the stator laminations, the bearing being formed as a spherical ball bearing in order to permit rotary as well as swinging motions. The outer part 18 of the bearing is fixed in the stator 2 which, in turn, is rigidly connected to the motor frame 1. Secured to the other end of the rotor 5 is a bushing 9 the inner circumferential wall of which is formed as a surface of revolution, frusto-conical in the form illustrated in the drawing. The frame 1 is on one of its short sides provided with a pivot 10 which extends into the bushing 9 and is provided with an external surface of revolution, also frusto-conical in form in the embodiment illustrated, and about which the rotor 5 with its bushing 9 will thus move as a conical pendulum. By choosing a suitable ratio of the diameters of the surfaces of revolution of the bushing and pivot it is possible to obtain a suitable value for the ratio of gearing, whereby the spinning of the rotor is stepped up to the desired frequency of vibration of the motor.

According to the invention, the air gap between the stator and rotor is preferably arranged in the following manner. The outer diameter of the stator is cylindrical, whereas the inner diameter of the rotor has the shape of a double cone. At 11 the inner diameter of the rotor is smallest and increases towards both ends in such manner that, when the rotor assumes the maximum angle from the centre line of the machine which is determined by the diameters of the bushing and the pivot, the inner diameter of the rotor at 12 or 13, respectively, will be so great that the air gap from 11 to 12 or 13, respectively, will become normal. Owing to this the field of force between the stator and rotor will be diagonally positioned, since the magnetic field of force follows the shortest way between the stator and rotor. This will result in a tendency of the rotor to place itself obliquely, which gives rise to a pressure between the bushing 9 and pivot 10 whereby, when the motor is started, the conical pendulum movement of the rotor will immediately begin.

The advantages of a vibration motor according to the invention are primarily to be found in its simple construction. The frequency of the vibration may, independently of the number of revolutions of the rotor, be varied within wide limits merely by changing the ratio of the diameters of the bushing and pivot. The centrifugal forces due to rotation will chiefly be taken up by the pivot 10, provided that the distribution of the mass of the rotor is such that the greater part of said mass is adjacent that end where the bushing is fixed. Moreover, the motor is only provided with one bearing as compared with a minimum of four bearings in a geared vibration motor of the ordinary type.

It is evident that the cooperating bushing and pivot in the pendulum system may change places, so that the end of the rotor is instead provided with a knob or similar extension having a surface of revolution coacting with the corresponding inside of a suitably dimensioned bushing rigidly connected to the motor frame. This reversal of parts will change nothing in the inventive principle, and is comparable to the alternative forms of conical pendulum illustrated in the above mentioned Patent No. 2,194,410.

I claim:

1. An electric vibration motor comprising a frame, a stator and a rotor, said stator being rigidly connected to the motor frame, the rotor being rotatably and swingably journalled in said motor frame; a surface of revolution rigidly connected to the motor frame and limiting the outward swing of the rotor, said rotor having a surface of revolution which in said extreme outward position of the rotor will contact the surface of revolution rigidly connected to the motor frame and roll on said surface when the rotor is spinning, said rotor thereby moving as a conical pendulum; the diameters of the respective surfaces of revolution having such a ratio that the conical pendulum movements of the rotor are by planetary action converted into vibrations of a higher frequency than the number of revolutions of said rotor.

2. An electric vibration motor comprising a frame, a stator rigidly connected to the motor frame, a rotor and a spherical ball bearing in the centre of the laminations of said stator rotatably and swingably supporting the rotor, the spherical ball bearing forming a jointed connection between one end of the rotor and the motor frame; a bushing at the other end of the rotor, and a pivot rigidly connected to the motor frame and extending into said bushing, said bushing having a surface adapted to contact with and roll against the surface of said pivot, whereby the rotor when spinning is caused to perform a planetary motion as a conical pendulum; the ratio of the diameters of the contacting surfaces of bushing and pivot being such that the conical pendulum movements of the rotor are by planetary action converted into vibrations of a higher frequency than the number of revolutions of said motor.

3. An electric vibration motor according to claim 1, wherein the air gap between the stator and rotor is shaped in such manner that the field of force between stator and rotor is located diagonally across the rotor so as to cause said rotor to assume an oblique position and thereby contact the surface of revolution rigidly connected to the motor frame.

FRIEDRICH ADOLPH.

REFERENCES CITED

The following references are of record in the file of this patent:

UNITED STATES PATENTS

| Number | Name | Date |
|---|---|---|
| 586,823 | Patten | July 20, 1897 |
| 1,495,784 | Fereday | May 27, 1924 |
| 2,194,410 | Svenson | Mar. 9, 1940 |